United States Patent
Scales et al.

(10) Patent No.: US 8,533,382 B2
(45) Date of Patent: Sep. 10, 2013

(54) METHOD AND SYSTEM FOR FREQUENT CHECKPOINTING

(75) Inventors: Daniel J. Scales, Mountain View, CA (US); Pratap Subrahmanyam, Saratoga, CA (US); Ganesh Venkitachalam, Mountain View, CA (US); Michael Nelson, Alamo, CA (US)

(73) Assignee: VMware, Inc., Palo Alto, CA (US)

( * ) Notice: Subject to any disclaimer, the term of this patent is extended or adjusted under 35 U.S.C. 154(b) by 455 days.

(21) Appl. No.: 12/683,273

(22) Filed: Jan. 6, 2010

(65) Prior Publication Data

US 2011/0167194 A1 Jul. 7, 2011

(51) Int. Cl.
*G06F 12/08* (2006.01)

(52) U.S. Cl.
USPC ............................................. 711/6; 711/206

(58) Field of Classification Search
USPC ......................................... 711/203, 207, 106
See application file for complete search history.

(56) References Cited

U.S. PATENT DOCUMENTS

| | | | |
|---|---|---|---|
| 7,093,086 B1 | 8/2006 | van Rietschote | |
| 7,380,051 B2 | 5/2008 | Birrell et al. | |
| 7,627,728 B1 | 12/2009 | Roeck et al. | |
| 7,962,703 B1* | 6/2011 | Shah et al. | 711/154 |
| 2008/0022032 A1* | 1/2008 | Nicholas et al. | 711/100 |
| 2008/0294937 A1* | 11/2008 | Ueda | 714/15 |
| 2009/0182976 A1* | 7/2009 | Agesen | 711/207 |
| 2009/0319580 A1* | 12/2009 | Lorenz et al. | 707/203 |
| 2010/0070678 A1* | 3/2010 | Zhang et al. | 711/6 |
| 2010/0106930 A1* | 4/2010 | Foltz et al. | 711/165 |
| 2010/0138616 A1* | 6/2010 | Banga et al. | 711/154 |
| 2010/0138827 A1* | 6/2010 | Frank et al. | 718/1 |
| 2010/0191887 A1* | 7/2010 | Serebrin | 710/267 |
| 2011/0016290 A1* | 1/2011 | Chobotaro et al. | 711/207 |
| 2011/0167195 A1 | 7/2011 | Scales et al. | |
| 2011/0167196 A1 | 7/2011 | Scales et al. | |

OTHER PUBLICATIONS

Cully et al. (Remus: High Availability via Asynchronous Virtual Machine Replication), NSDI'08 Proceedings of the 5$^{th}$ USENIX symposium on Networked System Design and Implementation pp. 161-174: ISBN: 111-999-5555-22-1.*

* cited by examiner

*Primary Examiner* — Kaushikkumar Patel

(57) ABSTRACT

A virtualization platform provides fault tolerance for a primary virtual machine by continuously transmitting checkpoint information of the primary virtual machine to a collector process, such as a backup virtual machine. When implemented on a hardware platform comprising a multiprocessor that supports nested page tables, the virtualization platform leverages the nested page table support to quickly identify memory pages that have been modified between checkpoints. The backup virtual machine provides feedback information to assist the virtualization platform in identifying candidate memory pages for transmitting actual modifications to the memory pages rather than the entire memory page as part of the checkpoint information. The virtualization platform further maintains a modification history data structure to identify memory pages that can be transmitted simultaneous with the execution of the primary virtual machine rather than while the primary virtual machine has been stunned.

23 Claims, 7 Drawing Sheets

METHOD AND SYSTEM FOR FREQUENT CHECKPOINTING

RELATED APPLICATIONS

This application is related to U.S. application Ser. No. 12/683,278 and U.S. application Ser. No. 12/683,288 filed on the same date.

BACKGROUND

The advantages of virtual machine (VM) technology have become widely recognized. Among these advantages is the ability to run multiple virtual machines on a single host platform. This makes better use of the capacity of the hardware, while still ensuring that each user enjoys the features of a "complete," isolated computer.

The advantages of various types of checkpointing are also widely recognized, such as providing a backup of some aspect of a computer system and providing the ability to revert back to a previously generated checkpoint to undo changes to some aspect of a computer system or to recover from a failure affecting the computer system. One particular use of checkpointing that is advantageous is to capture the state of a long-running computation, so that, if the computation fails at some point, it can be resumed from the checkpointed state, instead of having to restart the computation from the beginning.

Fast and frequent checkpointing of virtual machines is a useful technology for a number of applications: (1) continuous checkpointing allows users to revert back their application to almost any previous point in time; (2) reverse debugging based on deterministic replay also requires frequent checkpoints to reduce the amount of replay from a previous checkpoint that is required to execute backwards; (3) fast checkpoints can enable the possibility of speeding up an application by allowing speculative calculations that can be reverted if necessary; and (4) fast checkpoints provides a way of providing fault tolerance.

With respect to (4), fast and frequent checkpointing is especially attractive, since it can be used for symmetric multiprocessing (SMP) virtual machines. Deterministic replay is typically very hard to do efficiently for SMP VMs, so fault tolerance based on deterministic replay is typically only supported for single processor VMs.

SUMMARY

One or more embodiments of the present invention provide techniques to frequently transmit an updated state of a primary VM to a "collector process." In certain of such embodiments, the collector process is a backup VM (i.e., thereby enabling immediate resumption of the primary VM upon a failure). The execution of the primary VM is frequently and periodically suspended (each such suspended period referred to herein as a "checkpoint") during the course of execution to determine any modifications made to the state of the primary VM since the prior checkpoint. As used herein, suspending a VM is also referred to as "stunning" the VM, and resuming the VM is also referred to as "unstunning" the VM. Once the modifications (sometimes referred to herein as "checkpoint information") are determined, they are transmitted to the backup VM which is then able to merge the modifications into its current state, thereby reflecting an accurate state of the primary VM at the time of the checkpoint. Such frequent checkpointing techniques provide a viable option for providing fault tolerance for SMP based VMs, which are not able to utilize prior non-deterministic instruction stream record-replay techniques. In order to determine modifications, one embodiment takes advantage of hardware (e.g., nested page table walkers in SMP processors) that may be available on computer systems running the primary VM that allow for detecting modified pages using hardware controlled dirty bits in page tables used for memory virtualization. Such embodiments have the potential for being much faster than the typical page-protection method, since they do not lead to many expensive page protection faults.

One method, according to an embodiment, identifies a memory page of a virtual machine that has been modified during a time interval, wherein the virtual machine is executing on a computer system comprising a processor supporting nested page tables that map guest physical addresses referenced by a guest operating system of the virtual machine to system physical addresses in a system memory of the computer system. The method comprises halting execution of the virtual machine at the end of the time interval, scanning the nested page tables to identify a page table entry in the nested page tables that has been marked by the processor during the time interval to indicate a successful write operation to a memory page of the system memory corresponding to the page table entry, unmarking the page table entry prior to initiating a subsequent time interval and transmitting at least a portion of the memory page to a collector process executing on a second computer system. An alternative embodiment may further perform the step of identifying differences between a state of the memory page at the start of the time interval and a state of the memory page at the end of the time interval, wherein the transmitted portion of the memory page comprises the identified differences. Yet a further embodiment may perform the step of resuming execution of the virtual machine prior to the transmission step based upon a heuristic indicating a likelihood that the memory page will not be modified during the subsequent time interval.

DETAILED DESCRIPTION

Figure 1:
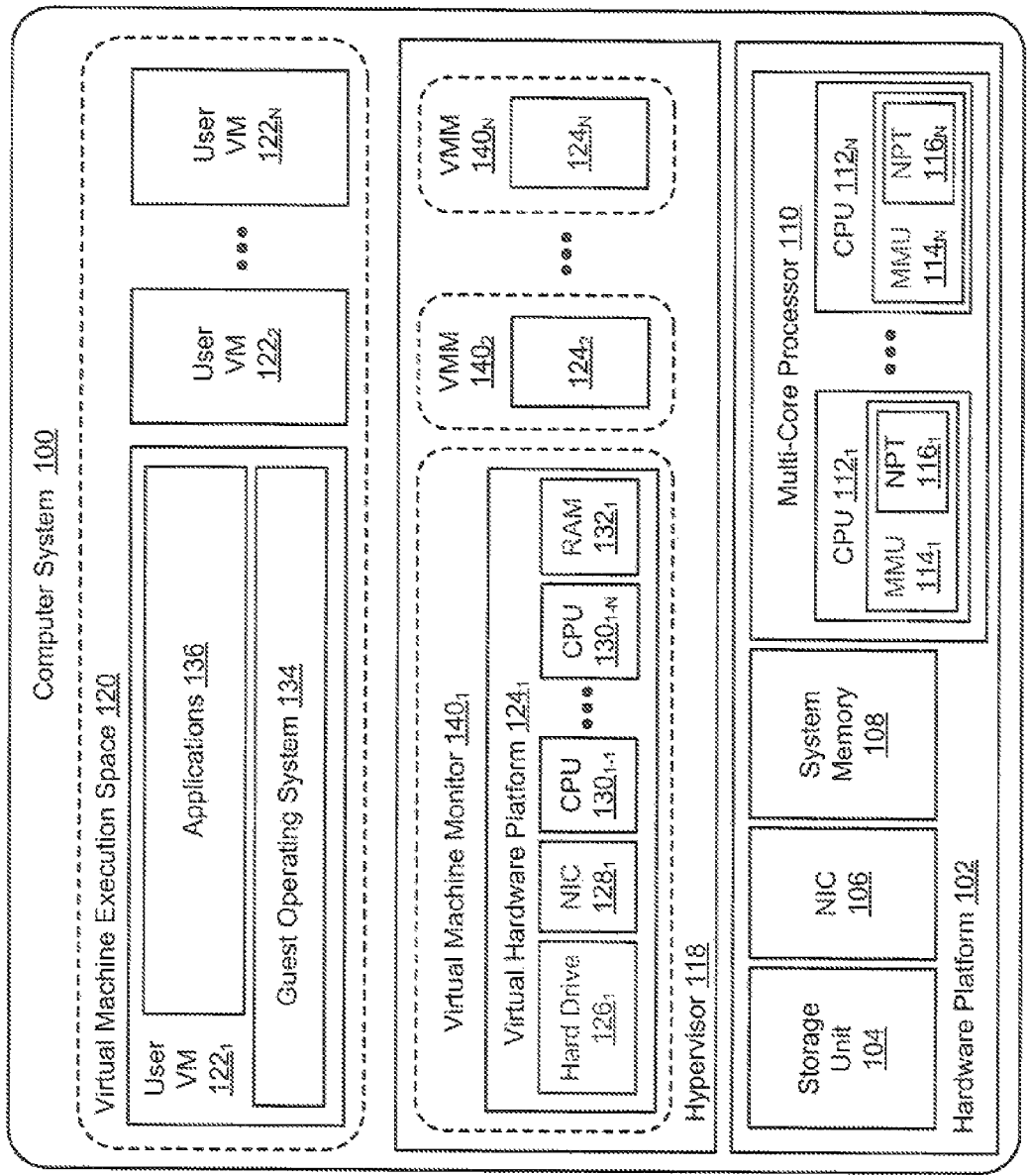
FIG. 1 depicts a block diagram of an SMP-based virtualized computer system.

FIG. 1 depicts a block diagram of an SMP-based virtualized computer system. In one embodiment, both a primary and a backup VM are implemented in separate physical computer systems similar to the SMP-based virtualized system of FIG. 1. Host computer system 100 may be constructed on a desktop, laptop or server grade hardware platform 102 such as an x86 architecture platform. Such a hardware platform may include a local storage unit 104, such as a hard drive, network adapter (NIC 106), system memory 108, symmetric multi-core processor 110 and other I/O devices such as, for example and without limitation, a mouse and keyboard (not shown in FIG. 1). Symmetric multi-core processor 110 provides multiple CPUs $112_1$ to $112_N$ which operate concurrently and can read and write to any portion of system memory 108. Each of CPUs $112_1$ to $112_N$ includes a memory management unit (MMU) $114_N$ with a support module $116_N$ for traversing nested page tables (NPT) that, as further described below, translate received physical addresses of a VM's guest operating system into the actual corresponding physical addresses of system memory 108 (support module $116_N$ also referred to herein as the "hardware NPT walker"). One example of a multi-core processor 110 that supports such nested page table structures is AMD's Opteron™ family of multi-core processors. It should be recognized that nested page tables are also sometimes referred to as extended page tables.

A virtualization software layer, also referred to hereinafter as hypervisor 118, is installed on top of hardware platform 102. Hypervisor 118 supports virtual machine execution space 120 within which multiple VMs may be concurrently instantiated and executed. As shown, virtual execution space 120 includes VMs $122_1$-$122_N$. For each of VMs $122_1$-$122_N$, hypervisor 118 manages a corresponding virtual hardware platform (i.e., virtual hardware platforms $124_1$-$124_N$) that includes emulated hardware such as virtual hard drive $126_1$, virtual NIC $128_1$, multiple virtual CPUs $130_{1-1}$ to $130_{1-N}$ and RAM $132_2$ for VM $122_1$. For example, virtual hardware platform $124_1$ may function as an equivalent of a standard x86 hardware architecture such that any x86 supported operating system, e.g., Microsoft Windows®, Linux®, Solaris® x86, NetWare, FreeBSD, etc., may be installed as guest operating system 134 to execute any supported application in application layer 136 for user VM $122_1$. Guest operating system 134 of VM $122_1$ includes device drivers (e.g., pre-existing device drivers available for guest operating system 134 etc.) that interact with emulated devices in virtual hardware platform $124_1$ as if such emulated devices were actual physical devices. Hypervisor 118 is responsible for transforming requests from device drivers in guest operating system 134 that are received by emulated devices in virtual platform $124_1$, into corresponding requests to corresponding physical devices in hardware platform 102.

It should be recognized that the various terms, layers and categorizations used to describe the virtualization components in FIG. 1 may be referred to differently without departing from their functionality or the spirit or scope of the invention. For example, virtual hardware platforms $124_1$-$124_N$ may be considered to be part of virtual machine monitors (VMM) $140_1$-$140_N$ which implement the virtual system support needed to coordinate operations between hypervisor 118 and their respective VMs. Alternatively, virtual hardware platforms $124_1$-$124_N$ may also be considered to be separate from VMMs $140_1$-$140_N$, and VMMs $140_1$-$140_N$ may be considered to be separate from hypervisor 118. One example of hypervisor 118 that may be used is included as a component of VMware's ESX™ product, which is commercially available from VMware, Inc. of Palo Alto, Calif. It should further be recognized that other virtualized computer system architectures may be used consistent with the teachings herein, such as hosted virtual machine systems, where the hypervisor is designed to run on top of a host operating system, or a shared storage array network (SAN) that is shared among various virtualized computer systems (e.g., clusters) in order to store virtual hard drives such as hard drive $126_1$.

Figure 2:
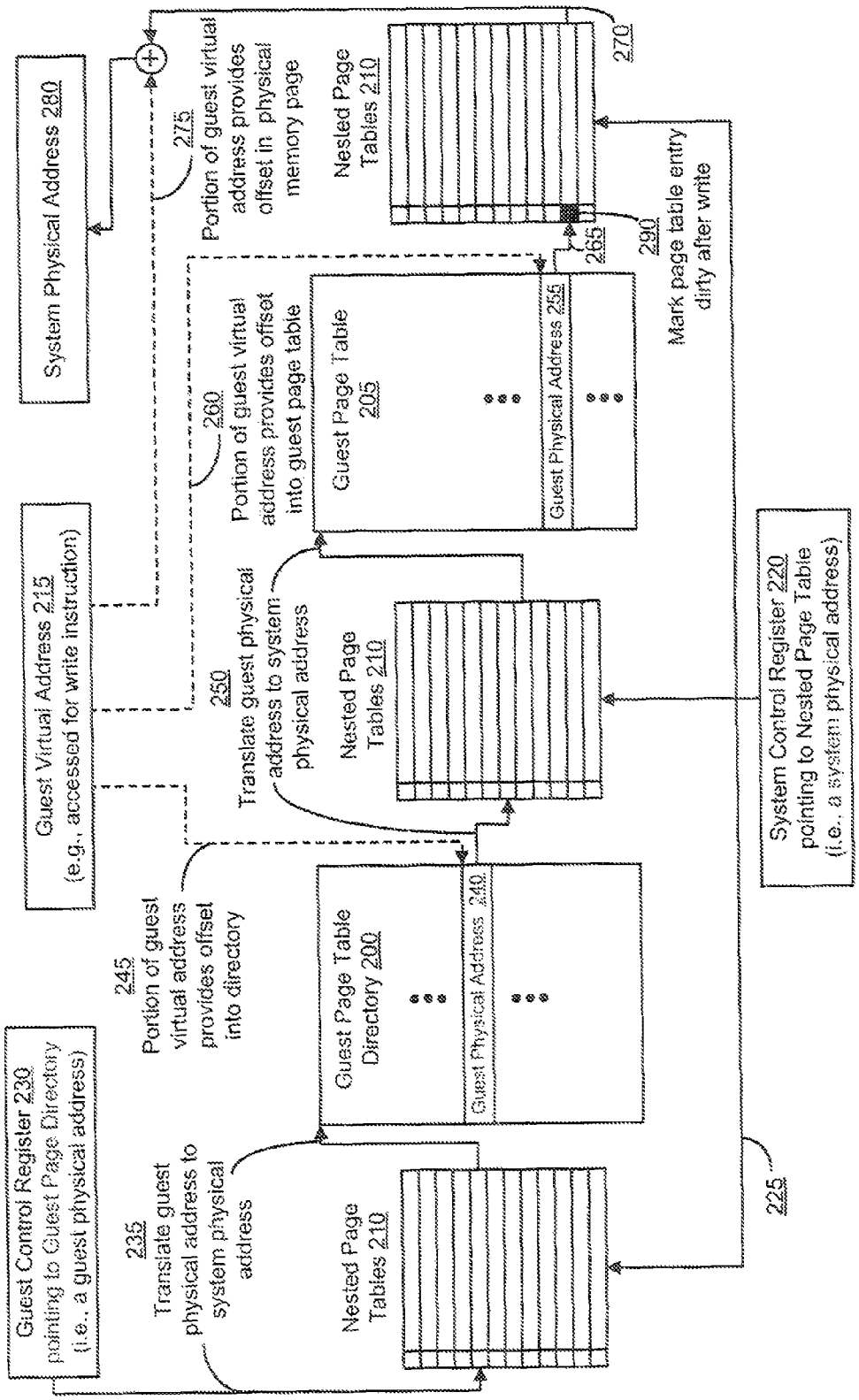
FIG. 2 depicts a logic diagram for memory address translations utilizing a CPU that supports nested page tables.

FIG. 2 depicts a logic diagram for memory address translations utilizing a CPU that supports nested page tables. For example, each of CPUs $112_1$ to $112_N$ of multi-core processor 110 includes an MMU $114_1$-$114_N$, respectively, that implements a hardware NPT walker (e.g., $116_1$-$116_N$). Guest operating system 134 utilizes and maintains a guest page table structure that stores mappings from guest virtual address to guest physical addresses. For example, the embodiment of FIG. 2 depicts a two level page table structure comprising a guest page directory 200 that includes a list of guest physical addresses referencing one of a plurality of guest page tables, such as guest table 205, that each includes a list of guest physical addresses referencing one of a plurality of memory pages. Simultaneously, hypervisor 118 maintains nested page tables 210 that store page table entries of mappings from guest physical addresses to system physical addresses. Although not depicted in FIG. 2, it should be recognized that nested page tables 210 may also be implemented as multi-leveled page tables similar to the guest page table structures. Hypervisor 118 provides hardware NPT walker $116_N$ access to both guest page table structure (i.e., guest page directory 200 and guest table 205) and the nested page tables 210 when performing memory address translations from a guest virtual address to a system physical address.

For example, when guest operating system 134 receives an instruction to write data to guest virtual address 215, guest operating system 134 communicates with virtual RAM $132_1$ in hypervisor 118. Hypervisor 118, in turn, requests hardware NPT walker $116_N$ to access a system control register 220 that stores a system physical address pointing to nested page tables 210 (sometimes referred to as control register CR3) as shown by arrow 225. Hardware NPT walker $116_N$ then accesses a guest control register 230 maintained by VM $122_1$ (e.g., sometimes referred to as guest control register gCR3) that stores a guest physical address pointing to guest page directory 200 and determines the actual system physical address of guest page directory 200 by "walking" nested page tables 210 as shown by arrows 235. Hardware NPT walker $116_N$ then accesses a first bit portion of guest virtual address 215 to determine an offset within guest page directory 200 that corresponds to an entry for guest physical address 240 that references and corresponds to guest page table 205, as shown by arrow 245. Hardware NPT walker $116_N$ walks nested page tables 210 again to determine the actual system physical address of guest page table 205, corresponding to guest physical address 240, as shown by arrows 250. Once the system physical address of guest page table 205 has been determined, hardware NPT walker $116_N$ then accesses a second bit portion of guest virtual address 215 to determine an offset within guest page table 205 that corresponds to a guest physical address 255 that references the page of guest physical memory containing guest virtual address 215, as shown by arrow 260. Hardware NPT walker $116_N$ walks nested page tables 210 again to determine the system physical address corresponding to guest physical address 255, as shown by arrows 265 and 270. Once the system physical address has been determined, hardware NPT walker $116_N$ then accesses a third bit portion of guest virtual address 215 to determine an offset, as shown by arrow 275, within the page of system physical memory pointed to by the determined system physical address in order to finally access system physical address 280 corresponding to guest physical address 215. Once the relevant data has been written to system physical address 280 in accordance with the write instruction, the page table entry of nested page table 210 is marked "dirty" (e.g., setting "dirty" bit) indicating that the page has been written to, as shown by marked entry 290.

Figure 3:
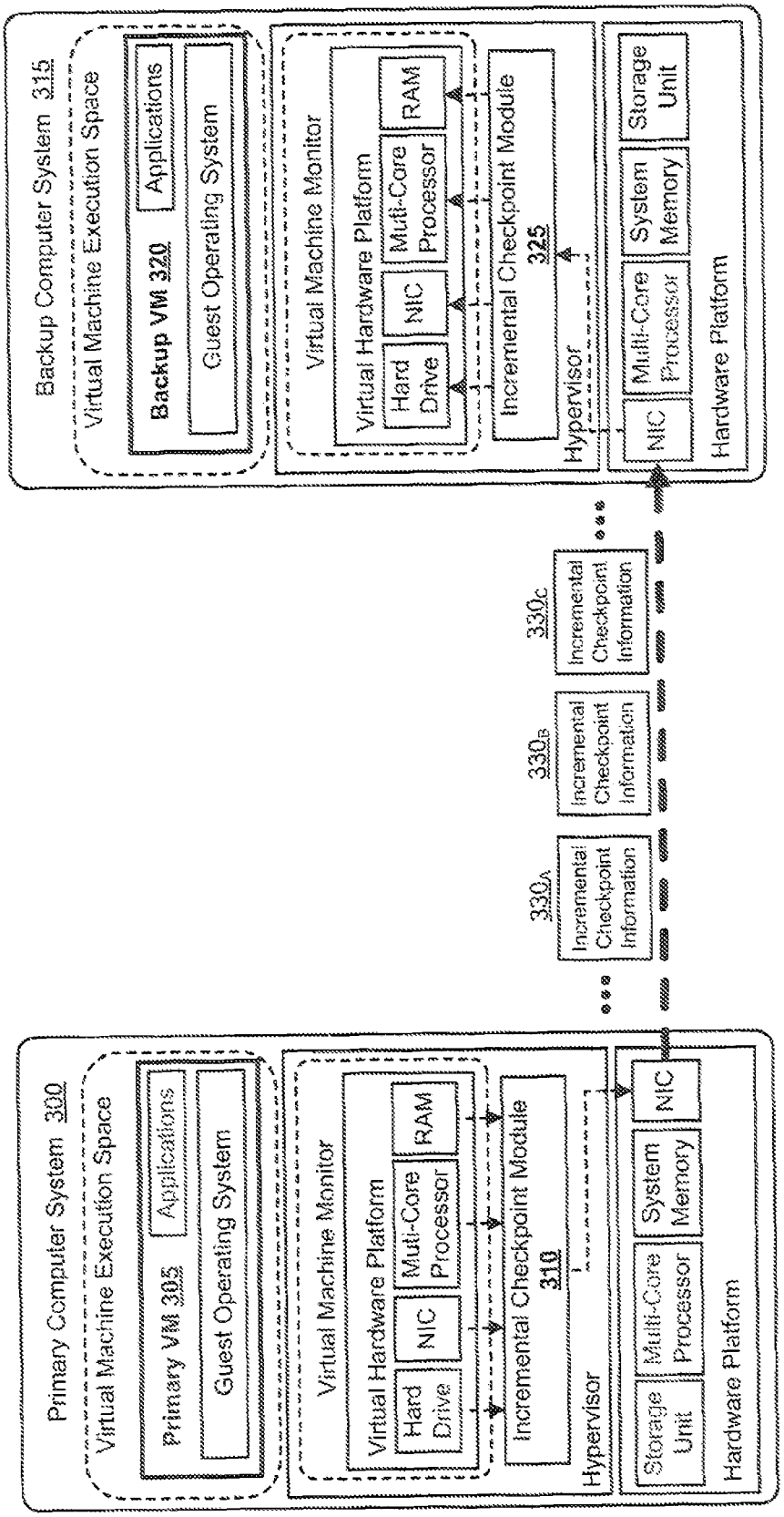
FIG. 3 depicts a block diagram of a primary VM and backup VM engaged in incremental and continuous checkpointing.

FIG. 3 depicts a block diagram of a primary VM and backup VM engaged in incremental and continuous checkpointing. A primary computer system 300 hosts primary VM 305 and includes an incremental checkpointing module 310 in its hypervisor. Incremental checkpointing module 310 continually and frequently transmits incremental checkpoint information packets (see, e.g., 330$_A$ to 330$_C$) over a network to a backup computer system 315 that hosts backup VM 320. Each checkpoint information packet includes information reflecting changes in the state of primary VM's 305 memory and emulated devices from the prior transmitted incremental checkpoint information packet. On backup computer system 315, incremental checkpointing module 325 of the hypervisor ultimately receives each of the transmitted checkpoint information packets and accordingly updates the state of the memory and emulated devices of backup VM 320 based on the checkpoint information packets. In one embodiment, initiation of the transmission of checkpoint information packets by incremental checkpointing module 310 occurs frequently, for example, once every 10 milliseconds.

Figure 4:
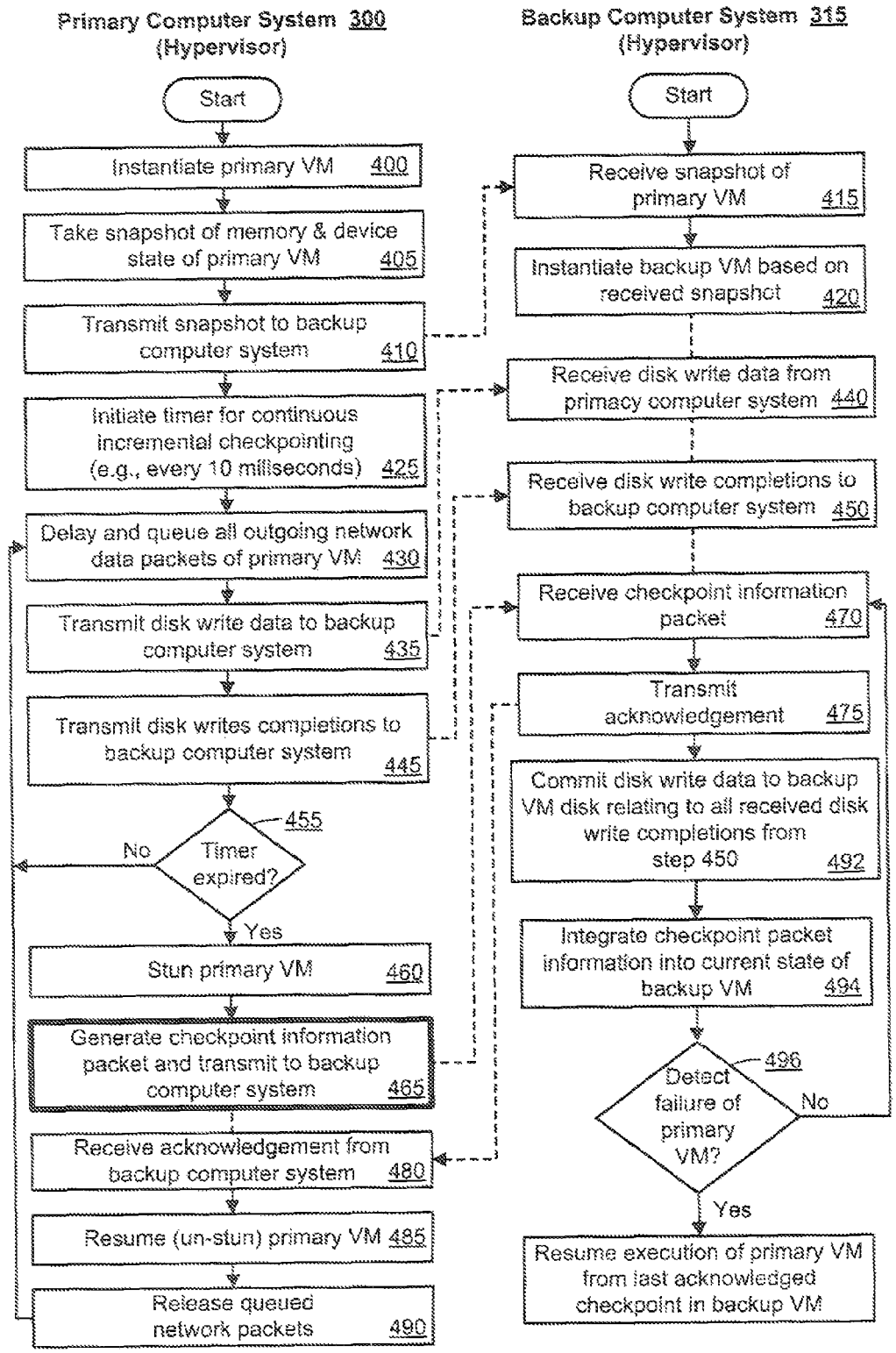
FIG. 4 depicts a flow diagram for transmitting incremental and continuous checkpoint information packets from a primary VM to a backup VM.

FIG. 4 depicts a flow diagram for transmitting incremental and continuous checkpoint information packets from a primary VM to a backup VM. In step 400, the hypervisor of primary computer system 300 instantiates primary VM 305. In step 405, the hypervisor of primary computer system 300 takes an initial snapshot of the state of primary VM 305 (e.g., state of memory and all emulated devices, etc.) and transmits the snapshot to backup computer system 315 in step 410. For example, in an embodiment utilizing VMware's ESX™ virtualization platform, VMware's VMotion technology can be used to create and transmit this initial snapshot. In step 415, backup computer system 315 receives the snapshot and its hypervisor instantiates backup VM 320 based upon the snapshot in step 420. In step 425, the hypervisor (e.g., its incremental checkpoint module 310) of primary VM 300 initiates a timer to frequently trigger the initiation of checkpoints to generate checkpoint information packets (e.g., every 10 milliseconds, etc.). Prior to the expiration of the timer, in step 430, the hypervisor delays and queues any and all outbound network packets generated by primary VM 305. In step 435, prior to the expiration of the timer, the hypervisor transmits any data for disk writes made by primary VM 305 during its execution to backup computer system 315, which receives the data in step 440. Similarly, in step 445, prior to the expiration of the timer, the hypervisor transmits all corresponding disk write completion messages to backup computer system 315, which receives the completion in step 450.

Once the timer expires (e.g., 10 milliseconds has lapsed) in step 455, the hypervisor initiates a checkpoint by stunning primary VM 305 (i.e., freezes its execution state) in step 460 and generates a checkpoint information packet reflecting the current state of stunned primary VM 305 and transmits the checkpoint information packet to backup computer system 315 in step 465. In step 470, the hypervisor of backup computer system 315 successfully receives the transmitted checkpoint information packet and in step 475 transmits an acknowledgement of successful receipt back to primary computer system 300. Once the hypervisor of primary computer system 300 receives the transmitted acknowledgement in step 480, the hypervisor resumes execution of primary VM 305 in step 485 and releases all the queued up network packets (from step 430) in step 490 before returning back to step 430. Once the hypervisor (e.g., its incremental checkpoint module 325) of backup computer system 315 transmits the acknowledgement in step 475, in step 492, the hypervisor commits to the disk of backup VM 320 all disk write data received prior to the expiration of the timer in step 440 for which the hypervisor also received a disk write completion signal in step 450. In step 494, the hypervisor of backup computer system 315 then merges or otherwise integrates the updated state reflected in the received checkpoint information packet (from step 470) into the current state of backup VM 320. Subsequently, in step 496, if backup computer system 315 detects that primary computer system 300 has failed, then in step 498, backup computer system 315 resumes execution of primary VM 305 as backup VM 320 from the last received (and acknowledged) checkpoint information packet. Delaying and queuing the outbound network packets in step 430 and releasing them only after an acknowledged checkpoint transaction (e.g., steps 475 to 480) in step 490 ensures that restoration of primary VM 305 by backup computer system 315 upon a failure of primary computer system 300 is based on a state of primary VM 305 that can properly resume network communications with external entities (i.e., re-transmit outbound network packets since the recovered state without confusing recipients, re-receive inbound network packets that it is expecting, etc.).

Transmitting a checkpoint information packet, as in step 465 of FIG. 4 comprises two main tasks: (1) capturing and transmitting the current state of the emulated devices of primary VM 305 that were modified since the last checkpoint information packet transmitted to backup computer system 315, and (2) capturing and transmitting modifications to the state of the memory of primary VM 305 since the last checkpoint information packet to transmitted backup computer system 315. In one embodiment, upon completion of the foregoing two tasks, the hypervisor of primary computer system 300 transmits an end-of-checkpoint message to backup computer system 315 indicating completion of its transmission of the checkpoint information packet, which serves as a trigger for backup computer system 315 to transmit its acknowledgement of receipt in step 475. With respect to capturing the current state of the modified emulated devices, in one embodiment, when the timer expires in step 455 of FIG. 4, the hypervisor of primary computer system 300 immediately stuns primary VM 305 without waiting for any current "in-flight" disk I/O operations to complete. Once primary VM 305 is stunned, incremental checkpoint module 310 captures the state of modified emulated devices of primary VM 305 as well as the state of any in-flight disk I/O operations for transmission to backup computer system 315 as part of a checkpoint information packet. In this manner, although the in-flight disk I/O operations are not part of the actual checkpoint state (i.e., because they have not completed), a resumption of execution at the completed checkpoint state by backup VM 320 will result in the re-issuance of the in-flight disk I/O operations.

Figure 5:
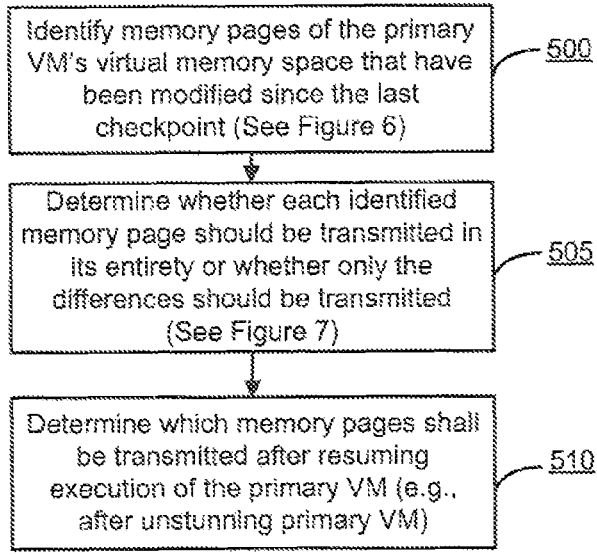
FIG. 5 depicts a flow diagram for optimizing the transmission of checkpoint information packets.

FIG. 5 depicts a flow diagram for optimizing the transmission of checkpoint information packets. In order to efficiently capture and transmit modifications to the state of the memory of primary VM 305 in a timely fashion, one embodiment implements three optimization phases as depicted by FIG. 5 to minimize the amount of time utilized to capture modifications to the state of memory of primary VM 305 while primary VM 305 remains stunned. In step 500, incremental checkpoint module 310 identifies those memory pages in the virtual memory space of primary VM 305 that have been modified since the last checkpoint information packet. In step 505, for each identified memory page, incremental checkpoint module 310 determines whether the entire memory page should be transmitted to backup computer system 315 (due to significant modifications within the memory page) or whether only the specific modifications in the memory page should be transmitted to backup computer system 315. In step 510, incremental checkpoint module 310 identifies those memory pages that can be transmitted in a "lazy" fashion, as further detailed below, after resuming execution of primary VM 305 in step 485 of FIG. 4 (i.e., un-stunning primary VM 305).

Figure 6:
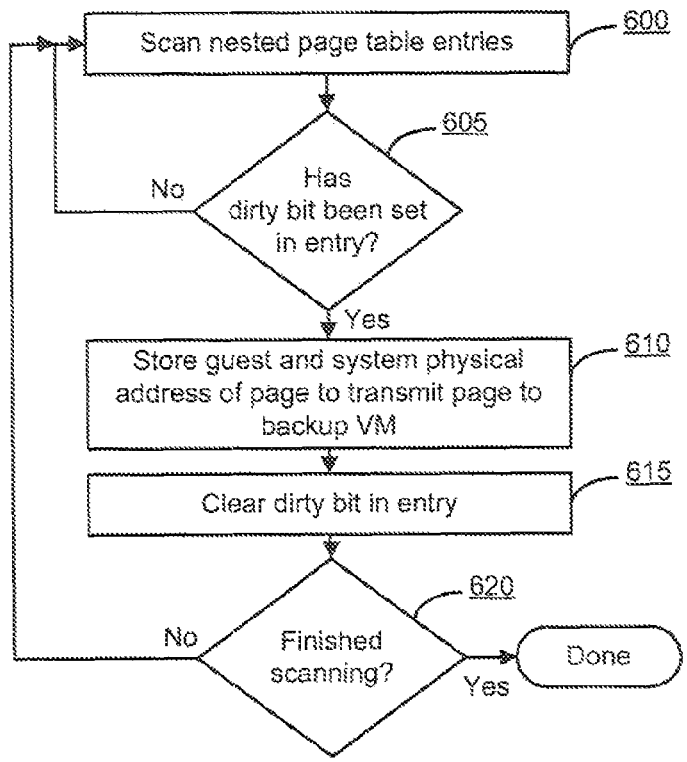
FIG. 6 depicts a flow diagram for identifying memory pages in the virtual memory space of a primary VM that have been modified since a last checkpoint information packet.

FIG. 6 depicts a flow diagram for identifying memory pages in the virtual memory space of a primary VM that have been modified since a last checkpoint information packet (i.e., step 500 of FIG. 5). To identify modified memory pages, one embodiment leverages the setting of dirty bits in nested page table entries by hardware NPT walker $116_N$ when writing to a system physical page as described in FIG. 2. Assuming that nested page table entries are cleared of all set dirty bits during the start of a checkpoint time interval (i.e., the time period between two consecutive checkpoints), in step 600, incremental checkpoint module 310 scans the page table entries in nested page tables 210. If, in step 605, incremental checkpoint module 310 encounters a page table entry with a set dirty bit, then in step 610, incremental checkpoint module 310 stores the guest physical address and system physical address corresponding to the page table entry with the set dirty bit in order to subsequently transmit the memory page (or analyze the memory page for transmission) to backup VM. In step 615, incremental checkpoint module 310 clears the set dirty bit for the nested page table entry in preparation for the next checkpoint time interval. In step 620, if scanning of the nested page table entries has not been completed, the flow returns to step 600. As described in the context of FIG. 2, because the dirty bits of nested page table entries are set by hardware NPT walker $116_N$ when a write operation is performed in a memory page, the foregoing steps enable incremental checkpoint module 310 to efficiently identify modified memory pages since the last checkpoint information packet.

It should be recognized that in certain embodiments, nested page tables are hierarchical, with multiple levels of page tables and page directories having entries pointing to different page tables (similar to guest page directory 200 and guest page table 205 in FIG. 2). In one such embodiment, hardware NPT walker $116_N$ also marks a page directory entry with a dirty bit if any memory page in the page directory entry's corresponding page table has been written. An alternative embodiment may mark page directory entries with an "access" bit if any memory page in a page directory entry's corresponding page table has been accessed (e.g., read or written). In either of such embodiments, incremental checkpoint module 310 can utilize hierarchical scanning of the nested page tables to further increase efficiencies, by only descending to the next level if a page directory entry has been marked with a dirty bit or an access bit. This optimization of hierarchical scanning using "access" or "dirty" bits in the page directories is particularly useful for very large memory VMs, since a large part of the memory of a VM may not be accessed or modified in each interval. In yet another alternative embodiment, the scanning of page table entries can be further optimized by subdividing the scanning task to be executed by multiple parallel executing threads. For example, subdivided scanning tasks can be assigned to parallel executing threads in a static round-robin fashion at the lowest page table level. The static assignment ensures that there is little overhead for assigning the tasks to threads, and the low-level interleaved assignment leads to a good load balance where each thread scans both "hot" and "cold" parts of the memory.

In yet another embodiment, scanning can be done "eagerly" by an independent thread while the VM is still running (i.e., before a checkpoint starts). Such eager scanning by the independent thread identifies memory pages that have been modified while simultaneously permitting a main executing thread to begin other useful computations on already-identified memory pages, such as "diff" computations on such identified memory pages (as further discussed in step 505 and further detailed in the context of FIG. 7). In such an eager scanning embodiment, the dirty bit of a memory page may be cleared when such computations begin on the memory page, such that it is easier to determine whether the memory page has been modified between the time the computation began and the next checkpoint started.

Figure 7:
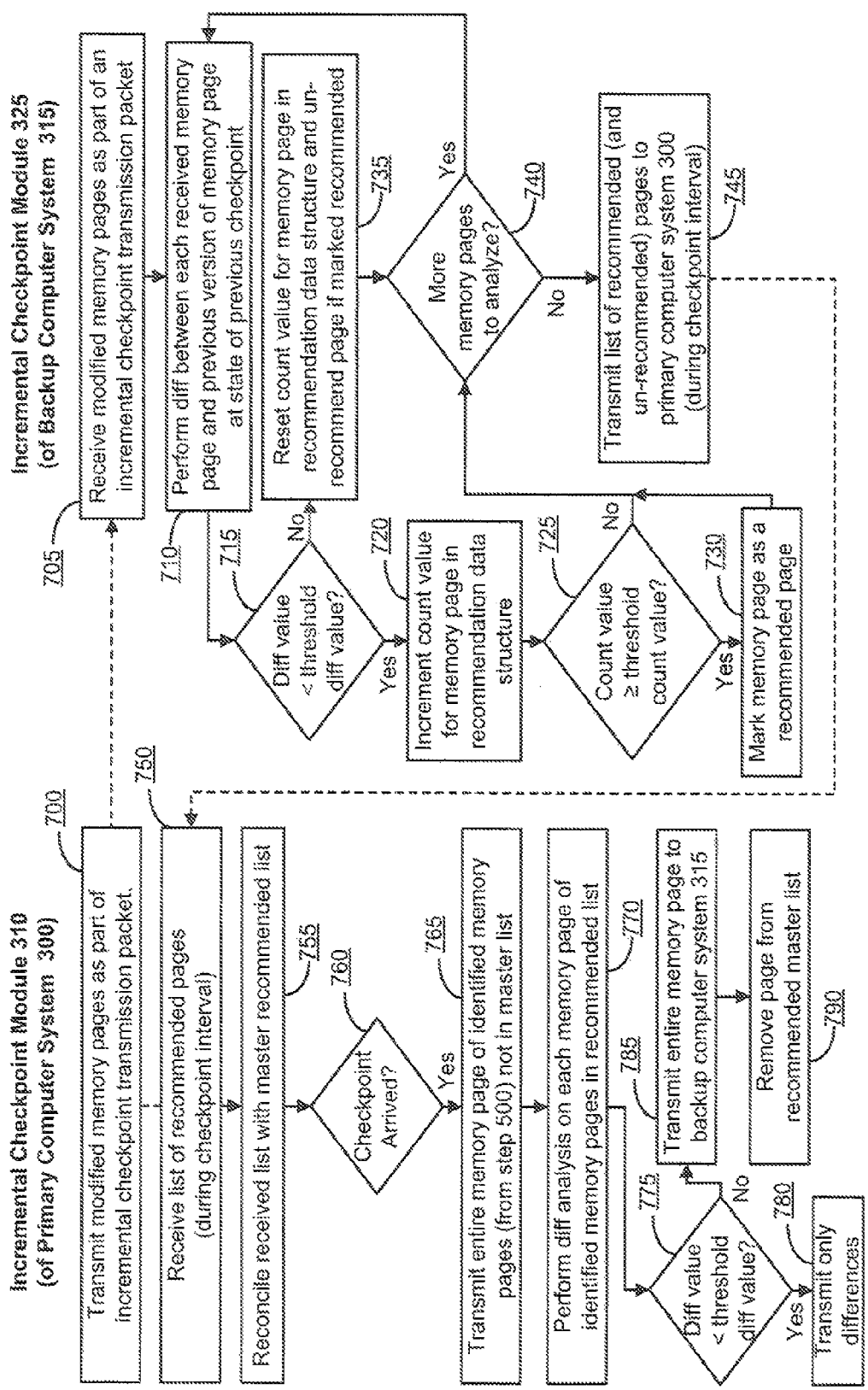
FIG. 7 depicts a flow diagram for determining whether to transmit an entire memory page of a primary VM or only modifications made to the memory page since the last checkpoint.

FIG. 7 depicts a flow diagram for determining whether to transmit an entire memory page of a primary VM or only modifications made to the memory page since the last checkpoint (i.e., step 505 of FIG. 5). An embodiment implementing FIG. 7 evaluates whether it is more efficient to transmit an entire memory page during a checkpoint or expend additional computational resources to determine the actual modifications made in the memory page, transmitting only the differences made to the memory page since the prior checkpoint (referred to herein as a "diff" transmission). Such an embodiment utilizes backup computer system 315 as a heuristic feedback mechanism that identifies memory pages having a higher probability of being a good diff transmission candidate. Incremental checkpoint module 325 of backup computer system 315 maintains a memory page recommendation data structure that identifies potential candidate memory pages for such diff transmissions.

In step 700, incremental checkpoint module 310 of primary computer system 300 transmits modified memory pages to backup computer system 315 as part of a checkpoint information packet and, in step 705, incremental checkpoint module 325 of backup computer system 315 receives the modified memory pages. Because the memory of backup VM 320 currently reflects the state of the previously completed checkpoint, in step 710, incremental checkpoint module 325 is able to perform a difference analysis (i.e., referred to herein as a "diff" or "diff analysis") by comparing each received modified memory page against the previous state of such memory page at the previously completed checkpoint. In step 715, incremental checkpoint module 325 determines whether the performed diff analysis for each modified memory page generates a resulting diff value that is less than a threshold diff value. For example, in one embodiment, each memory page for primary VM 305 (and backup VM 320) may comprise 4096 bytes (i.e., 4 KB). In such an embodiment, incremental checkpoint module 325 may perform a comparison for every 8 bytes in a memory page. The resulting diff value is the number of the 512 (i.e., 4096 divided by 8) performed 8-byte comparisons that indicate differences. Incremental checkpoint module 325 then determines whether the resulting diff value is less than a threshold diff value, for example, of 7. In step 720, if the resulting diff value is less than the threshold diff value, incremental checkpoint module 325 increments a count value maintained by the memory page recommendation data structure for the memory page. In step 725, if the count is greater or equal to a threshold count value, then, in step 730, incremental checkpoint module 325 marks the memory page as a recommended memory page for possible diff transmission. For example, a threshold count value of 10 indicates that minimal modifications (e.g., less than 7 8-byte comparisons revealed differences) were made to the memory page the last 10 times that the memory page was modified. Returning to step 715, if the resulting diff value is not less than the threshold diff value, in step 735, the count value of an entry for the memory page in the memory page recommendation data structure is reset to zero and, if the memory page was marked as recommended, it is unmarked. Once all modified memory pages have been analyzed as indicated by step 740, incremental checkpoint module 325 transmits a list of all the newly recommended memory pages (and newly un-recommended pages from step 735, in certain embodiments) to primary computer system 300 in step 745. In certain embodiments, this transmission step typically occurs during a checkpoint interval due to the time needed by backup computer system 315 to perform the various diff analyses.

In step 750, incremental checkpoint module 310 of primary computer system 300 receives the transmitted list. Incremental checkpoint module 310 also maintains its own master recommended list of memory pages. For each memory page listed in the master recommended list, incremental checkpoint module 310 maintains a copy of the memory page reflecting its state at the last checkpoint (e.g., in order to perform diff analysis on such memory pages). In step 755, incremental checkpoint module 310 reconciles the received recommended list with its master recommended list by adding newly recommended pages to the master recommended list and removing pages that have been un-recommended. Starting with the next checkpoint, incremental checkpoint module 310 will begin maintaining a copy of memory pages corresponding to such newly recommended pages. Similarly, incremental checkpoint module 310 discards its maintained copy of un-recommended memory pages. Upon the arrival of the next checkpoint in step 760, incremental checkpoint module 310 immediately initiates transmission all identified modified pages (e.g., from step 500 of FIG. 5) in their entirety that are not in the master recommended list in step 765. In step 770, incremental checkpoint module 310 performs a diff analysis for each memory page in the master recommended list, similar to the diff analyses performed by incremental checkpoint module 324 in backup computer system 315 (it should be recognized, however, that newly added recommended memory pages during reconciliation step 755 may need to wait until the subsequent checkpoints for such diff analysis since incremental checkpoint module 310 has not yet begun maintaining a copy of the state of the memory page from prior checkpoints). If, in step 775, the resulting diff value for a memory page is less than a threshold diff value, then in step 780, incremental checkpoint module 310 extracts the differences between the modified memory page and the stored copy of its previous checkpoint state and transmits the difference to backup computer system 315. If, in step 775, the resulting diff value for a memory page is not less than the threshold diff value, then in step 785, incremental checkpoint module 310 transmits the entire memory page to backup computer system 315 and in step 790, removes the page from the master recommended list. In certain embodiments, the transmission of the non-recommended pages proceeds in parallel with the foregoing diff analysis of the recommended pages, depending on the capabilities of the networking hardware (such as RDMA) and available CPU power. Such embodiments efficiently use the available network bandwidth and "hide" the time required for the diff analysis from the perspective of the backup computer system 315. In addition, the foregoing diff analysis process may be parallelized in alternative embodiments. For example, if extra CPU power is available, many parallel threads may be used to do the foregoing diff analysis. It should be recognized that the diff analysis may be limited by the usable bandwidth to memory (e.g., for accessing in all the pages being diff'ed), and therefore, implementing diff analysis using multiple threads may be particularly useful if significantly more memory bandwidth is available by running the diff analysis on multiple cores or sockets.

It should be recognized that the various aforementioned threshold values (e.g., threshold diff values, threshold count values, etc.) may be configurable by an administrator or other user in certain embodiments and that primary computer system 300 and backup computer system 315 may utilize different threshold values. For example, on one embodiment, the threshold diff value in step 715 for backup computer system 315 may be 7, while the threshold diff value in step 775 for primary computer system 300 may be 11. It should further be recognized that embodiments can additionally impose a cap on the number of pages that are subject to diff analysis, for example, based upon an evaluation of the computational speed of diff analyses on primary computer system 300 compared to the speed of the network. If the network speed is high relative to the speed of diff analyses, incremental checkpoint module 310 can impose a cap on the performance of diff analyses so that fewer pages are analyzed than is recommended by the master recommended list. One potentially optimal arrangement would be to diff only enough memory pages so that the time to diff those pages is about the same time as is needed to send the remaining non-diffed pages. Conversely, if the network speed is slow relative to the speed of diff analysis, incremental checkpoint module 310 may perform diff analysis on all the memory pages in the master recommended list in order to reduce the required network bandwidth to a minimum. Furthermore, embodiments may enable such caps, as well as threshold diff values, to be dynamically modified upon an evaluation of network speed. Still further embodiments may implement further optimizations, such as performing diff analyses on primary computer system 300 with non-cached read operations such that the diff analyses do not impact the data cache performance of primary VM 305 (e.g., by inadvertently filling the data cache with data that is only relevant to diff analyses rather than to the execution flow of primary VM 305, etc.). Similarly, other embodiments may perform diff analyses on a different processor core on primary computer system 300 so that such diff analyses do not compete for resources with the transmission of entire memory pages. It should further be recognized that any known data structures such as linked lists, tables, collections, and the like may be used to implement the master recommended list of primary computer system 300 and memory page recommendation list data structure of backup computer system 315.

Figure 8:
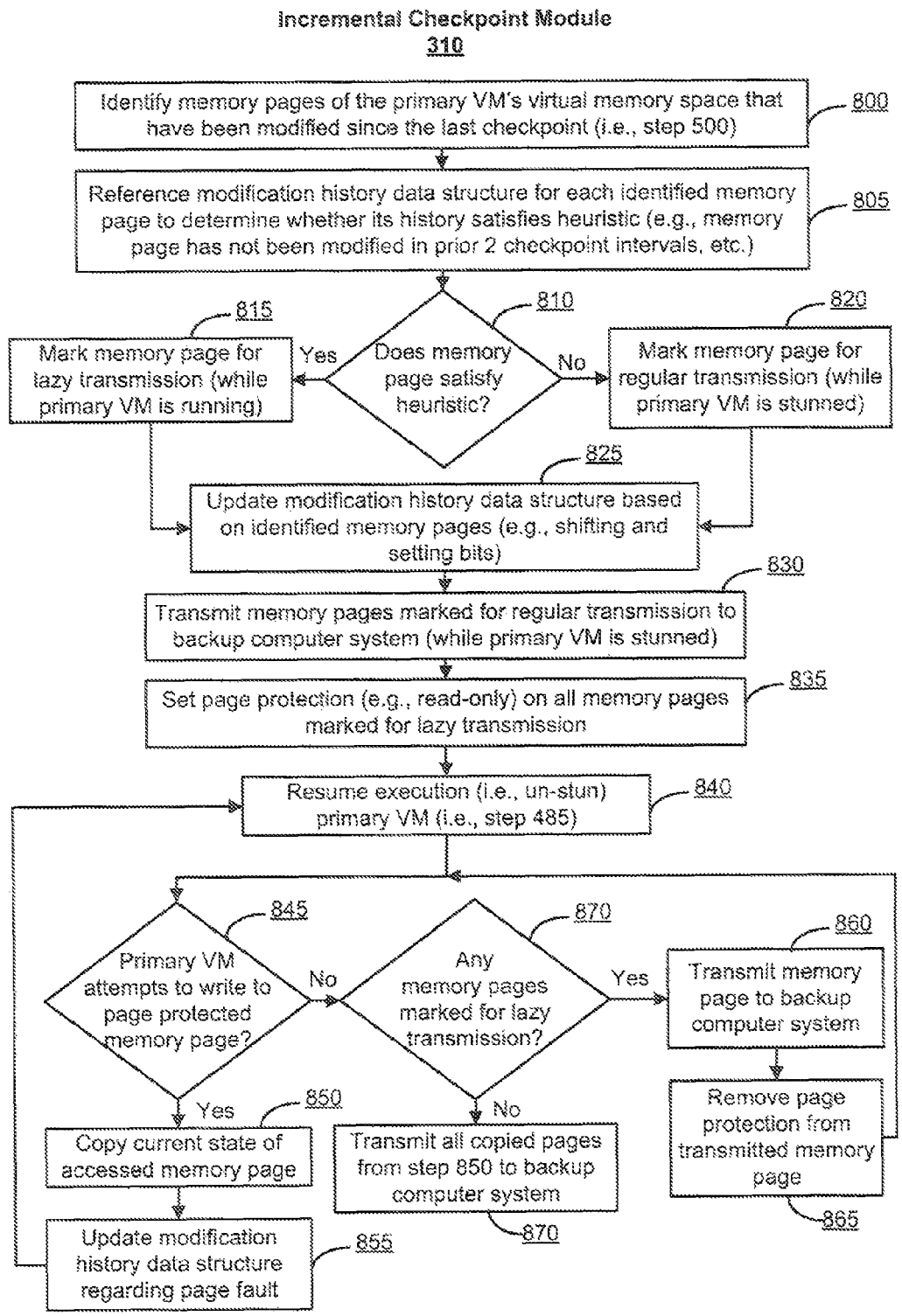
FIG. 8 depicts a flow diagram for determining whether to "lazy" transmit a memory page of a primary VM after un-stunning the primary VM.

FIG. 8 depicts a flow diagram for determining whether to permit "lazy" transmission of a memory page of a primary VM after un-stunning the primary VM (i.e., step 510 of FIG. 5). An embodiment implementing FIG. 8 employs a heuristic to predict the likelihood that a modified memory page (as identified in step 500 of FIG. 5) may not be modified again during execution of primary VM 305 in the upcoming checkpoint interval. Identifying such memory pages enables incremental checkpoint module 310 to un-stun primary VM 305 (e.g., step 485 of FIG. 4) earlier, before transmitting such memory pages, thereby increasing efficiencies. If the heuristic is accurate, then execution of primary VM 305 will not affect the state of such memory pages as they are transmitted simultaneously with the execution of primary VM 305. Incremental checkpoint module 310 of such an embodiment maintains a data structure that records a history of modifications made to each memory page over a number of previous checkpoint intervals (referred to herein as a "modification history data structure"). For example, one such modification history data structure may store a sequence of n bits for each memory page, where each bit in the sequence represents one of the previous n checkpoint intervals. In such a modification history data structure, a set bit indicates that the memory page was modified in the corresponding checkpoint interval. Alternative embodiments may further supplement such a modification history data structure with additional bits for each memory page, for example, to indicate whether the memory page was previously transmitted lazily and whether such lazy transmission was successful (e.g., resuming execution of primary VM 305 did not change the state of the memory page during the checkpoint interval).

In step 800, incremental checkpoint module 310 identifies the memory pages of primary VM 305 that have been modified since the prior checkpoint (as in step 500 of FIG. 5). In step 805, for each such memory page, incremental checkpoint module 310 references its modification history data structure to determine whether such memory page satisfies a heuristic for assessing whether to lazily transmit the memory page. In one embodiment, for example, such a heuristic is satisfied by confirming that the memory page was not modified during the prior two checkpoint intervals (e.g., by checking the corresponding bits in the modification history data structure). Such a heuristic is based upon the probability that a memory page that is currently modified but was not modified during the prior two checkpoint intervals would likely not be modified again in the upcoming checkpoint interval. If, in step 810, the modification history data structure indicates that the history of the memory page satisfies the heuristic, then in step 815, incremental checkpoint module 310 marks the memory page for lazy transmission. If, in step 810, the modification history data structure indicates that the history of the memory does not satisfy the heuristic, then, in step 820, incremental checkpoint module 310 marks the memory page for regular transmission while primary VM 305 remains stunned. In step 825, incremental checkpoint module 310 updates its modification history data structure, for example, by shifting each bit value down for each memory page and setting a new bit for the currently handled checkpoint interval if the memory page has been modified as indicated in step 800. In step 830, incremental checkpoint module 310 transmits all memory pages marked for regular transmission in step 820 while primary VM 205 remains stunned. In step 835, incremental checkpoint module 310 sets memory page protection on all memory pages selected for lazy transmission in step 815, for example, by marking each of the memory pages as read-only. In this manner, if primary VM 305 tries to write to any of the memory pages selected for lazy transmission, a page fault will occur, causing a trap to the hypervisor, thereby enabling incremental checkpoint module 310 to handle the situation. In step 840, incremental checkpoint module 310 then resumes execution of primary VM 305 by un-stunning it, as in step 485 of FIG. 4.

In step 845, if, during execution, primary VM 305 attempts to write to a currently page protected memory page, a page fault occurs, ceding execution control to incremental checkpoint module 310 by trapping to the hypervisor. In step 850, incremental checkpoint module 310 copies the current state of the page protected memory page, and in step 855, may set a bit in the modification history data structure indicating that lazy transmission for the memory page was unsuccessful (i.e., as a result of the primary VM's write operation to the memory page) before returning to step 840 to resume execution of primary VM, permitting completion of the write operation on the memory page. Simultaneously, during execution of primary VM 305, incremental checkpoint module 310 continually transmits the memory pages marked for lazy transmission to backup computer system 315 in step 860, each time removing page protection from a successfully transmitted memory page in step 865, until all memory pages marked for lazy transmission have been transmitted in step 870. Subsequently, in step 875, incremental checkpoint module 310 transmits all memory pages that it copied in step 850 to backup computer system 315. It should be recognized that incremental checkpoint module 310 of alternative embodiments may wait until all memory pages marked for lazy transmission have been transmitted in step 860 before releasing page protection for all such memory pages in step 865, rather than incrementally releasing page protection as each memory page is transmitted as depicted in FIG. 8. Alternatively, the page protections for lazily transmitted memory pages may be released in large groups, after the pages in those groups have been transmitted. Such an alternative embodiment may be useful when the cost for releasing page protection is smaller per page when done for a large group of pages at a time (e.g., if all page mappings must be invalidated because there is no operation to invalidate a single page mapping). Alternative embodiments may also immediately send the relevant memory page to backup computer system 315 upon encountering a page fault in step 845 rather than copying the memory page for subsequent transmission in step 870. It should be further recognized that diff transmissions as depicted in step 780 of FIG. 7 may be similarly lazily transmitted for memory pages satisfying the lazy transmission heuristic. In addition, diff analysis for such pages may or may not be done lazily.

It should be recognized that various modifications and changes may be made to the specific embodiments described herein without departing from the broader spirit and scope of the invention as set forth in the appended claims. For example, while the foregoing discussions have focused on incremental and continuous checkpointing for fault tolerance, it should be recognized that such techniques may also be used to enable users to revert back in an application to almost any previous point in time, to perform reverse debugging, and to speed up applications by allowing speculative calculations that can be reverted if necessary. Similarly, while the foregoing embodiments have been generally described using a backup VM, any collector process and any backup computer system may be used consistent with the teachings herein. Use of the term "backup computer system" should not be construed as necessarily providing any other types of "backup" functions, other than the functions supporting continuous checkpointing as described herein. For example, a backup computer system may support collector processes other than backup virtual VMs for fault tolerance purposes such as for use in reverting back to particular points of applications, reverse debugging, and speeding up applications.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method for identifying a memory page of a virtual machine that has been modified during a time interval, wherein the virtual machine is executing on a computer system comprising a processor supporting nested page tables that map guest physical addresses referenced by a guest operating system of the virtual machine to system physical addresses in a system memory of the computer system, the method comprising:
   halting execution of the virtual machine at the end of the time interval;
   scanning the nested page tables to identify a page table entry in the nested page tables that has been marked by the processor during the time interval to indicate a successful write operation to a memory page of the system memory corresponding to the page table entry, wherein said scanning is subdivided into a plurality of subtasks and each of the said subtasks is allocated to a parallel executing thread;
   unmarking the page table entry prior to initiating a subsequent time interval; and
   transmitting at least a portion of the memory page to a collector process executing on a second computer system.

2. The method of claim 1, further comprising the step of identifying differences between a state of the memory page at the start of the time interval and a state of the memory page at the end of the time interval, wherein the transmitted portion of the memory page comprises the identified differences.

3. The method of claim 2, further comprising the step of resuming execution of the virtual machine prior to the transmission step based upon a heuristic indicating a likelihood that the memory page will not be modified during the subsequent time interval.

4. The method of claim 1, wherein the nested page tables are organized in hierarchical levels referenced by page directories.

5. The method of claim 1, wherein the scanning step only scans a nested page table if an entry for the nested page table in a corresponding page directory indicates that a memory page corresponding to a page table entry in the nested page table has been modified.

6. The method of claim 1, wherein the virtual machine is supported by a virtual multi-core processor.

7. The method of claim 1, wherein the collector process is a backup virtual machine.

8. A computer-readable storage medium including instructions that, when executed by a computer processor supporting nested page tables that map guest physical addresses referenced by a guest operating system of a virtual machine to system physical addresses in a system memory, causes the computer processor to identify a memory page of the virtual machine that has been modified during a time interval by performing the steps of:
   halting execution of the virtual machine at the end of the time interval;
   scanning the nested page tables to identify a page table entry in the nested page tables that has been marked by the processor during the time interval to indicate a successful write operation to a memory page of the system memory corresponding to the page table entry, wherein said scanning is subdivided into a plurality of subtasks and each of the said subtasks is allocated to a parallel executing thread;
   unmarking the page table entry prior to initiating a subsequent time interval; and
   transmitting at least a portion of the memory page to a collector process executing on a second computer system.

9. The computer-readable storage medium of claim 8, further including instructions that, when executed by the computer processor, perform the step of identifying differences between a state of the memory page at the start of the time interval and a state of the memory page at the end of the time interval, wherein the transmitted portion of the memory page comprises the identified differences.

10. The computer-readable storage medium of claim 9, further including instructions that, when executed by the computer processor, perform the step of resuming execution of the virtual machine prior to the transmission step based upon a heuristic indicating a likelihood that the memory page will not be modified during the subsequent time interval.

11. The computer-readable storage medium of claim 8, wherein the nested page tables are organized in hierarchical levels referenced by page directories.

12. The computer-readable storage medium of claim 8, wherein the scanning step only scans a nested page table if an entry for the nested page table in a corresponding page directory indicates that a memory page corresponding to a page table entry in the nested page table has been modified.

13. The computer-readable storage medium of claim 8, wherein the virtual machine is supported by a virtual multi-core processor.

14. The computer-readable storage medium of claim 8, wherein the collector process is a backup virtual machine.

15. A computer system configured to periodically provide updated state information of a primary virtual machine running on the computer system to a collector process running on a second computer system, the computer system comprising:
   a multi-core processor comprising a plurality of processing units, wherein each processing unit comprises a support module for nested page tables; and
   a system memory comprising a hypervisor component configured to (i) instantiate the primary virtual machine, (ii) maintain nested page tables that map guest physical addresses referenced by a guest operating system of the primary virtual machine to system physical addresses in the system memory, and (iii) identify a memory page of the primary virtual machine that has been modified during a time interval by performing the steps of halting execution of the primary virtual machine at the end of the time interval, scanning the nested page tables to identify a page table entry in the nested page tables that has been marked by the processor during the time interval to indicate a successful write operation to a memory page of the system memory corresponding to the page table entry, wherein said scanning is subdivided into a plurality of subtasks and each of the said subtasks is allocated to a parallel executing thread, unmarking the page table entry prior to initiating a subsequent time interval, and transmitting at least a portion of the memory page to the collector process.

16. The computer system of claim 15, wherein the hypervisor component is further configured to identify differences between a state of the memory page at the start of the time interval and a state of the memory page at the end of the time interval, wherein the transmitted portion of the memory page comprises the identified differences.

17. The computer system of claim 16, wherein the hypervisor component is further configured to resume execution of the primary virtual machine prior to the transmission step based upon a heuristic indicating a likelihood that the memory page will not be modified during the subsequent time interval.

18. The computer system of claim 15, wherein the nested page tables are organized in hierarchical levels referenced by page directories.

19. The computer system of claim 15, wherein the scanning step performed by the hypervisor component only scans a nested page table if an entry for the nested page table in a corresponding page directory indicates that a memory page corresponding to a page table entry in the nested page table has been modified.

20. The computer system of claim 15, wherein the collector process is a backup virtual machine.

21. A method for identifying a memory page of a virtual machine that has been modified during a time interval, wherein the virtual machine is executing on a computer system comprising a processor supporting nested page tables that map guest physical addresses referenced by a guest operating system of the virtual machine to system physical addresses in a system memory of the computer system, the method comprising:
   scanning the nested page tables during the time interval to determine whether a page table entry in the nested page tables is marked by the processor to indicate a successful write operation to a memory page of the system memory corresponding to the page table entry;
   comparing the memory page to a prior version of the memory page to generate a first difference output based on modified portions of the memory page;
   unmarking the page table upon said comparing;
   halting execution of the virtual machine at the end of the time interval;
   scanning the nested page tables to determine whether the page table entry is marked;
   if the page table entry is marked, comparing the memory page to the prior version of the memory page to generate a second difference output based on modified portions of the memory page, unmarking the page table entry, and transmitting said second difference output to a collector process executing on a second computer system; and
   if the page table entry is not marked, transmitting said first difference output to said collector process executing on said second computer system.

22. The method of claim 21, further comprising the step of resuming execution of the virtual machine prior to said transmission of said first difference output or prior to said transmission of said second difference output based upon a heuristic indicating a likelihood that the memory page will not be modified during the subsequent time interval.

23. The method of claim 21, wherein the step of scanning scans a nested page table only if an entry for the nested page table in a corresponding page directory indicates that a memory page corresponding to a page table entry in the nested page table has been modified.

* * * * *